United States Patent
Kimes et al.

(10) Patent No.: US 11,828,335 B2
(45) Date of Patent: Nov. 28, 2023

(54) DRIVELINE DISCONNECT ASSEMBLY

(71) Applicant: Sigma Powertrain, Inc., Livonia, MI (US)

(72) Inventors: John W Kimes, Wayne, MI (US); Jeffrey L Viola, Berkley, MI (US)

(73) Assignee: Sigma Powertrain, Inc., Livonia, MI (US)

( * ) Notice: Subject to any disclaimer, the term of this patent is extended or adjusted under 35 U.S.C. 154(b) by 0 days.

(21) Appl. No.: 17/724,170

(22) Filed: Apr. 19, 2022

(65) Prior Publication Data

US 2023/0332651 A1  Oct. 19, 2023

(51) Int. Cl.
*F16D 27/00* (2006.01)
*B60B 27/00* (2006.01)
*B60K 17/02* (2006.01)

(52) U.S. Cl.
CPC ........ *F16D 27/004* (2013.01); *B60B 27/0026* (2013.01); *B60B 27/0068* (2013.01); *B60K 17/02* (2013.01); *F16D 2500/1022* (2013.01); *F16D 2500/10412* (2013.01); *F16D 2500/30401* (2013.01)

(58) Field of Classification Search
None
See application file for complete search history.

(56) References Cited

U.S. PATENT DOCUMENTS

| | | | |
|---|---|---|---|
| 6,109,411 A * | 8/2000 | Bigley | B60K 17/354 301/105.1 |
| 10,323,699 B2 * | 6/2019 | Beesley | F16D 11/14 |
| 10,941,816 B2 * | 3/2021 | Kajikawa | B60K 5/02 |
| 2016/0265602 A1 * | 9/2016 | Pritchard | F16D 27/118 |
| 2020/0094675 A1 * | 3/2020 | Johnston | F16D 27/118 |
| 2022/0325786 A1 * | 10/2022 | Davis | F16H 48/24 |

* cited by examiner

*Primary Examiner* — Timothy Hannon
(74) *Attorney, Agent, or Firm* — Simonelli IP, PLLC

(57) ABSTRACT

A driveline disconnect assembly disconnects a wheel hub from a drive shaft supported by a grounding component, such as a suspension knuckle. The driveline disconnect assembly includes a support frame that is fixedly secured to the grounding component. The support frame extends around at least a portion of the drive shaft and extends between first and second support frame sides. The support frame defines a central axis. A linear actuator is fixedly secured to the support frame and extends around at least a portion of the drive shaft. The linear actuator includes a shift sleeve moving axially relative to the support frame. The shift sleeve extends around at least a portion of the drive shaft to selectively engage and disengage the wheel hub to connect and disconnect the wheel hub from the drive shaft, respectively.

3 Claims, 11 Drawing Sheets

DRIVELINE DISCONNECT ASSEMBLY

BACKGROUND ART

1. Field of the Invention

The invention relates to a disconnect assembly. More particularly, the invention relates to a disconnect assembly that disconnects two devices that can rotate together or independently of each other.

2. Description of the Related Art

There are situations when two devices need to rotate together. Other times, the two devices need to be disconnected from each other to allow them to rotate independently of each other. Selectively coupling these rotating devices together can be difficult. One example of a coupling system is disclosed in U.S. Pat. No. 11,215,245 B2. This system requires solenoids and multiple coupling members. These types of devices are complex with multiple moving pieces. They also are heavy and require clearance to install and operate.

SUMMARY OF THE INVENTION

A driveline disconnect assembly disconnects a wheel hub from a drive shaft supported by a grounding component. The driveline disconnect assembly includes a support frame that is fixedly secured to the grounding component. The support frame extends around at least a portion of the drive shaft and extends between first and second support frame sides. The support frame defines a central axis. A linear actuator is fixedly secured to the support frame and extends around at least a portion of the drive shaft. The linear actuator includes a shift sleeve moving axially relative to the support frame. The shift sleeve extends around at least a portion of the drive shaft to selectively engage and disengage the wheel hub to connect and disconnect the wheel hub from the drive shaft, respectively.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
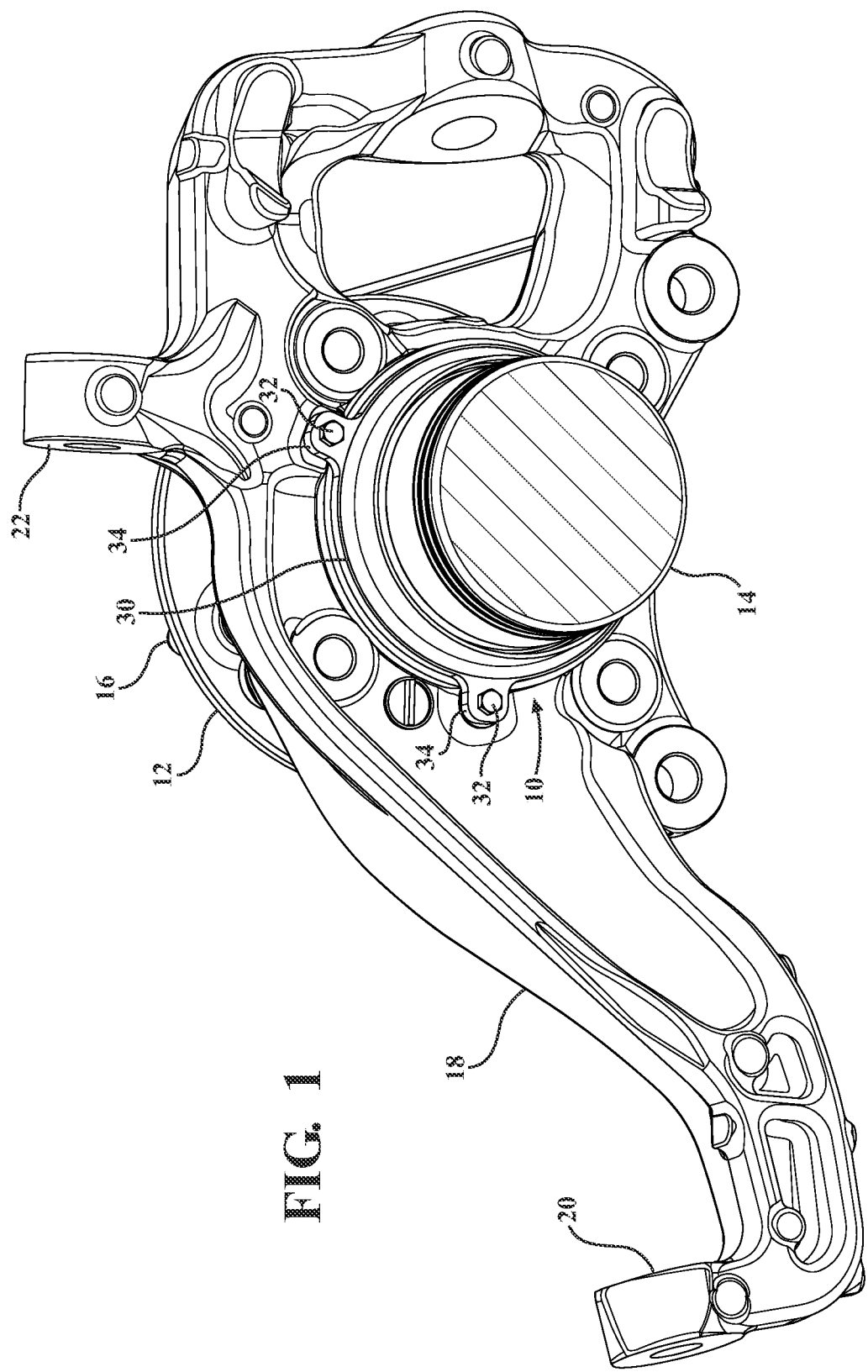
FIG. 1 is a perspective view of one embodiment of a driveline disconnect assembly secured to a grounding component of a vehicle with a driven shaft shown in cross section.
Figure 2:
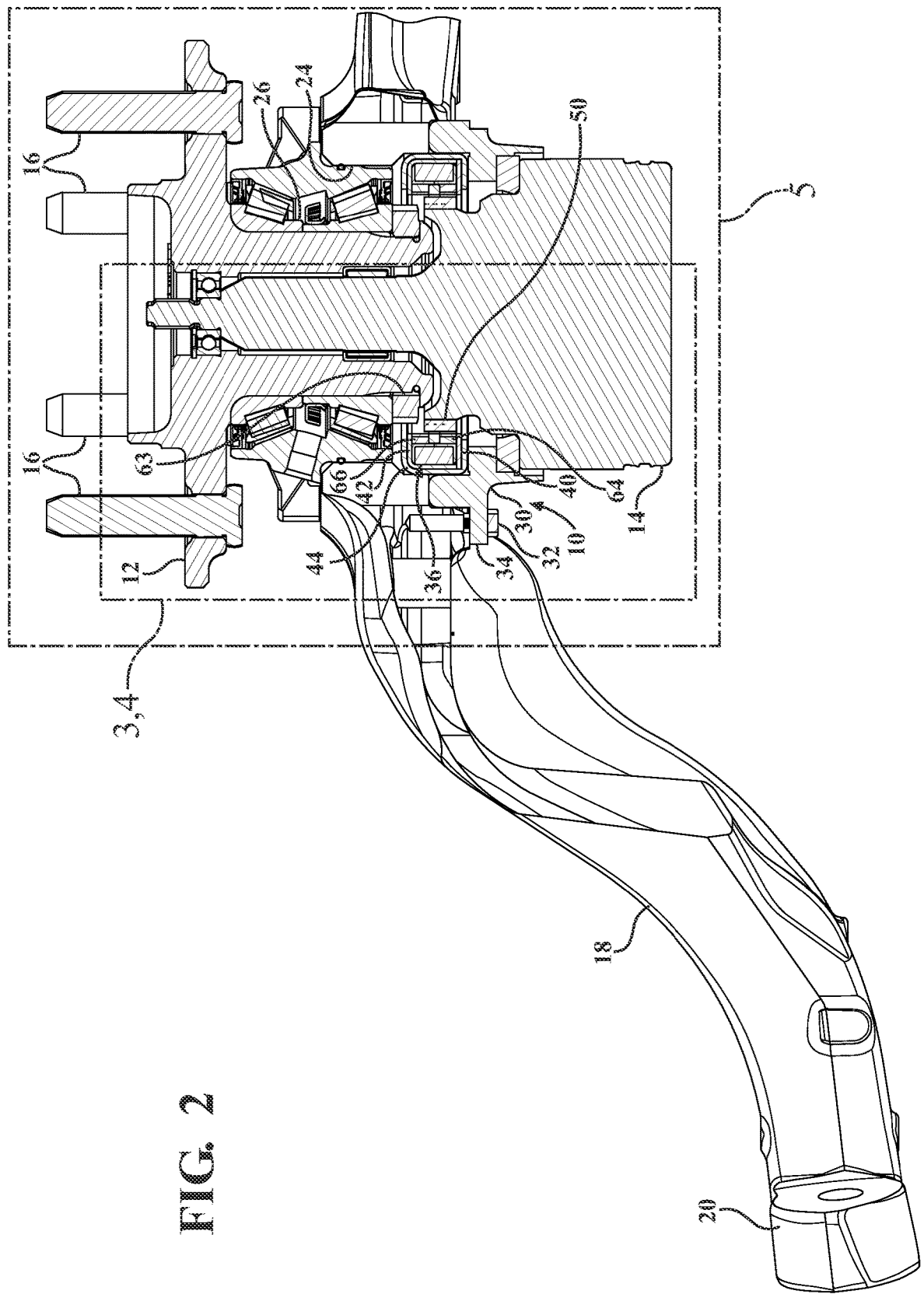
FIG. 2 is a top view of the grounding component and a cross-sectional top view of the driveline disconnect assembly of FIG. 1 secured to a wheel hub, shown in cross section.

For purposes of this discussion, elements will be identified by reference characters, typically reference numerals. There are several embodiments shown in the Figures that will be described in detail below. For purposes of simplicity, similar elements between the various embodiments will be offset by the hundreds digit, unless otherwise indicated. If an element has characteristics that are different from one embodiment to another, those differences will be discussed when introducing the same element for the new embodiment.

Referring to FIGS. 1 through 4, one embodiment of a driveline disconnect assembly is generally indicated at 10. The driveline disconnect assembly 10 disconnects a wheel hub 12 from a drive shaft 14. When the driveline disconnect assembly 10 disconnects the wheel hub 12 from the drive shaft 14, the wheel hub 12 can rotate independently from the drive shaft 14. This condition is akin to the wheel hub 12 being in neutral. When the driveline disconnect assembly 10 connects the wheel hub 12 to the drive shaft 14, the drive shaft 14 can transfer torque to the wheel hub 12 to rotate the wheel hub 12 and tire (not shown). It should be appreciated by those skilled in the art that the driveline disconnect assembly 10 can be utilized between any two rotating bodies where one of the rotating bodies is transferring torque and the other of the two rotating bodies is receiving the torque from the first rotating body.

The wheel hub 12 is supported in space allowing it to rotate with respect to the structure around it—in this case, a vehicle (not shown). A plurality of threaded lug studs 16 are used to secure a wheel (not shown) to the wheel hub 12. A grounding component 18 supports and positions wheel hub 12. In the embodiment shown, the grounding component 18 is a suspension knuckle 18. The suspension knuckle 18 includes a plurality of securing fixtures 20, 22 providing a way to secure the suspension knuckle 18 to the vehicle. The suspension knuckle 18 further includes an opening 24 (best seen in FIGS. 2 through 4). It should be appreciated by those skilled in the art that the grounding component 18 may also be a differential case, a transmission case, a vehicle frame, and the like.

The opening 24 allows a hub shaft 26 of the wheel hub 12 and the drive shaft 14 to extend therethrough with the drive shaft 14 extending into the hub shaft 26.

The driveline disconnect assembly 10 includes a support frame 30 fixedly secured to the suspension knuckle 18. A plurality of bolts 32 extend through a plurality of flanges 34 of the support frame 30 to threadingly engage with the suspension knuckle 18. It should be appreciated by those skilled in the art that the support frame 30 may be secured to the suspension knuckle 18 using other suitable devices. Although the support frame 30 shown in the Figures is an open frame, utilizing the grounding element 18, the suspension knuckle 18 in this case, for a portion of the "frame," it should be appreciated by those skilled in the art that there are embodiments where the support frame 30 is a substantially to completely enclosed casing for the driveline disconnect assembly 10.

The support frame 30 extends around at least a portion of the drive shaft 14. In the embodiment shown, the support frame 30 extends around the entire drive shaft 14, as well as the opening 24 for the suspension knuckle 18. The support frame 30 defines a central axis A. The support frame 30, the drive shaft 14 and the hub shaft 26 are all coaxial with the axis A being the central axis for all of these elements.

The driveline disconnect assembly 10 includes a linear actuator, generally shown at 36. The linear actuator 36 is fixedly secured to the support frame 30. The linear actuator 36 extends around at least a portion of the drive shaft 14 commensurate with the support frame 30. In the embodiments shown, the linear actuator 36 extends around the entire drive shaft 14 forming a circle or ring thereabout. The linear actuator 36 defines a disconnect side 40 and a connect side 42. The linear actuator 36 includes a U-shaped shell 44 that extends about three sides of the linear actuator 36, including the disconnect 40 and connect 42 sides.

The linear actuator 36 includes an electromagnetic coil 46 that is wound around the entire linear actuator 36. Two electrical leads (neither shown) are connected to a source of electrical current that can flow in either direction. The electrical current flowing through electromagnetic coil 46 creates a magnetic field, the direction of the magnetic field is based on the current direction of the electrical current flowing through the electromagnetic coil 46, as is known in the art. The electromagnetic coil 46 extends between the disconnect side 40 and the connect side 42 of the linear actuator 36.

A ring 48 extends between the disconnect 40 and the connect 42 sides of the linear actuator 36. The ring 48 may be unitary in construction or it may consist of a composite of ringlets that form the ring 48. In the embodiment shown in the Figures, the ring 48 is unitary in construction and is fabricated from a non-ferromagnetic material. In other embodiments, the ring 48 may be fabricated from ferromagnetic material. Alternatively, the ring 48 may be fabricated from one or more ringlets, wherein ferromagnetic ringlets and non-ferromagnetic ringlets may be used together to form the ring 48.

The driveline disconnect assembly 10 also includes a shift sleeve 50. The shift sleeve 50 moves axially relative to the drive shaft 14. The shift sleeve 50 extends around at least a portion of the drive shaft 14. In the embodiments shown, the shift sleeve 50 extends around the entire drive shaft 14. The shift sleeve 50 selectively engages and disengages the wheel hub 12 to connect and disconnect the wheel hub 12 to and from the drive shaft 14, respectively.

The shift sleeve 50 is circular in cross section and includes an inner surface 52. A plurality of teeth 54 extend along the inner surface 52. The shift sleeve 50 also defines an outer surface 56, which is in spaced relation to an inner diameter of the electromagnetic coil 46. The plurality of teeth 54 spline with drive shaft teeth 60 such that there is never any lost motion between the drive shaft 14 and the shift sleeve 50. While the shift sleeve 50 moves axially with respect to the linear actuator 36 and the drive shaft 14, the shift sleeve always rotates in synchronization with the drive shaft 14.

Figure 3:
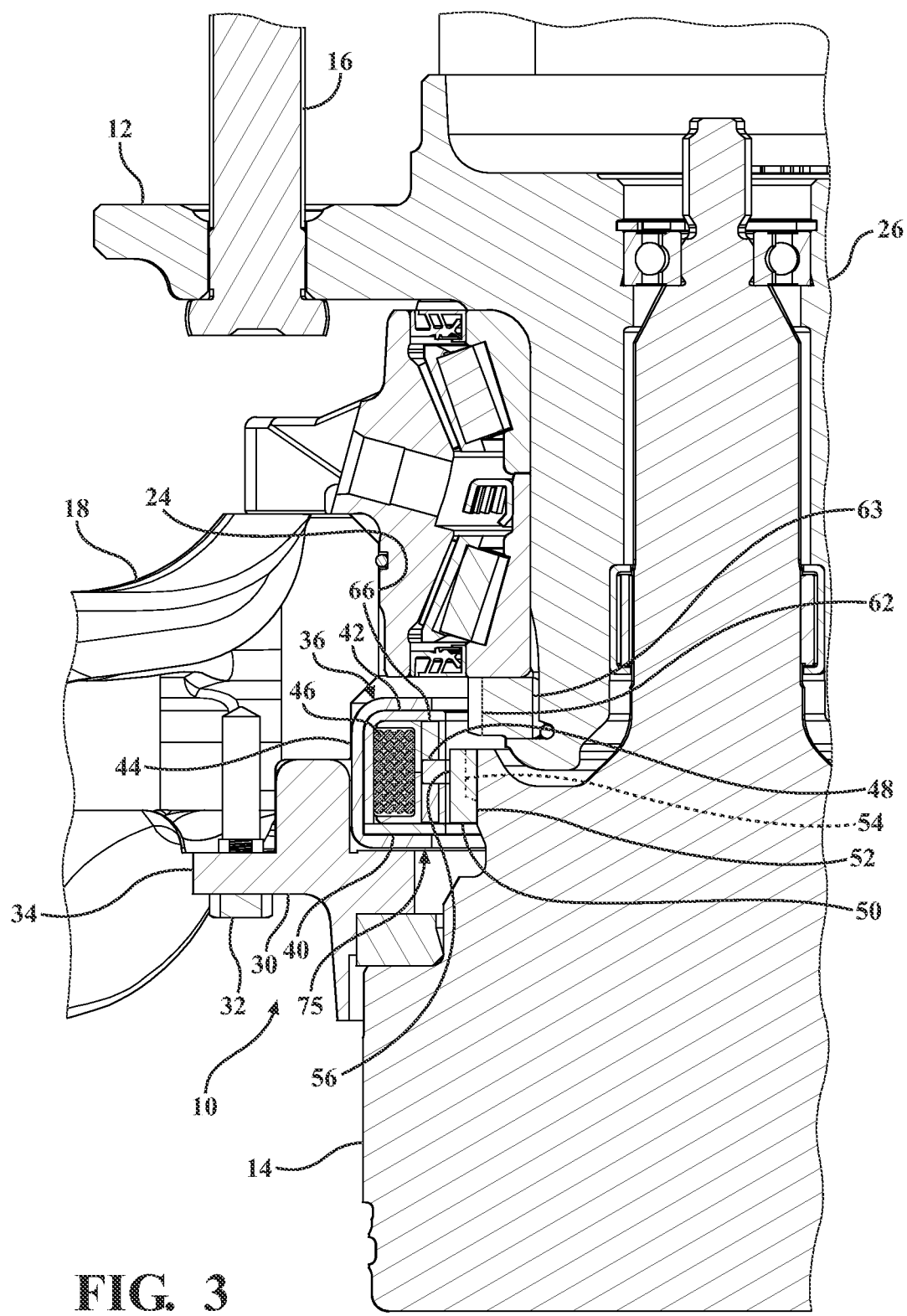
FIG. 3 is a cross-sectional top view of box 3 of FIG. 2 with a shift sleeve in a disconnect position.
Figure 4:
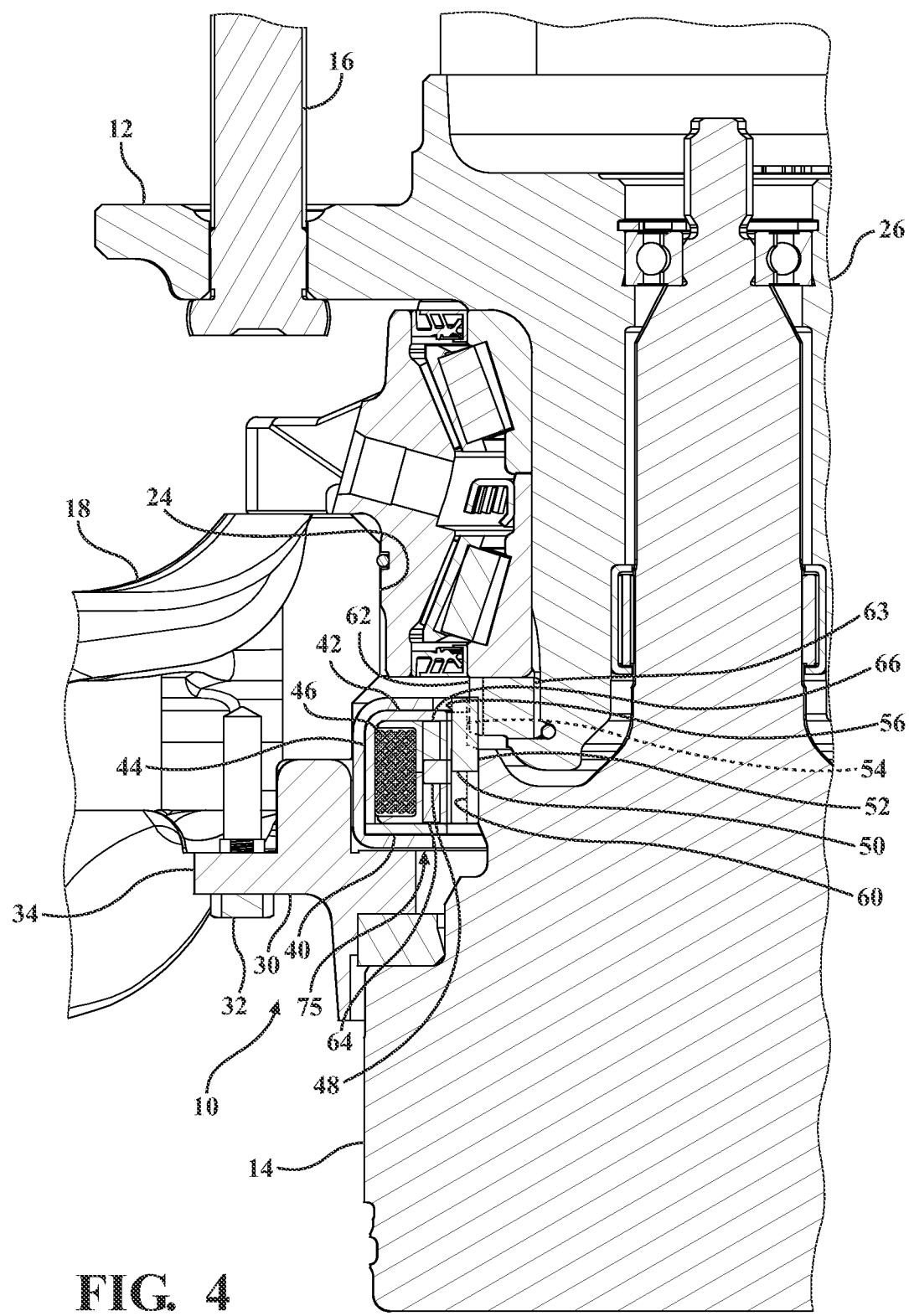
FIG. 4 is a cross-sectional top view of box 3 of FIG. 2 with a shift sleeve in a connect position.
Figure 5:
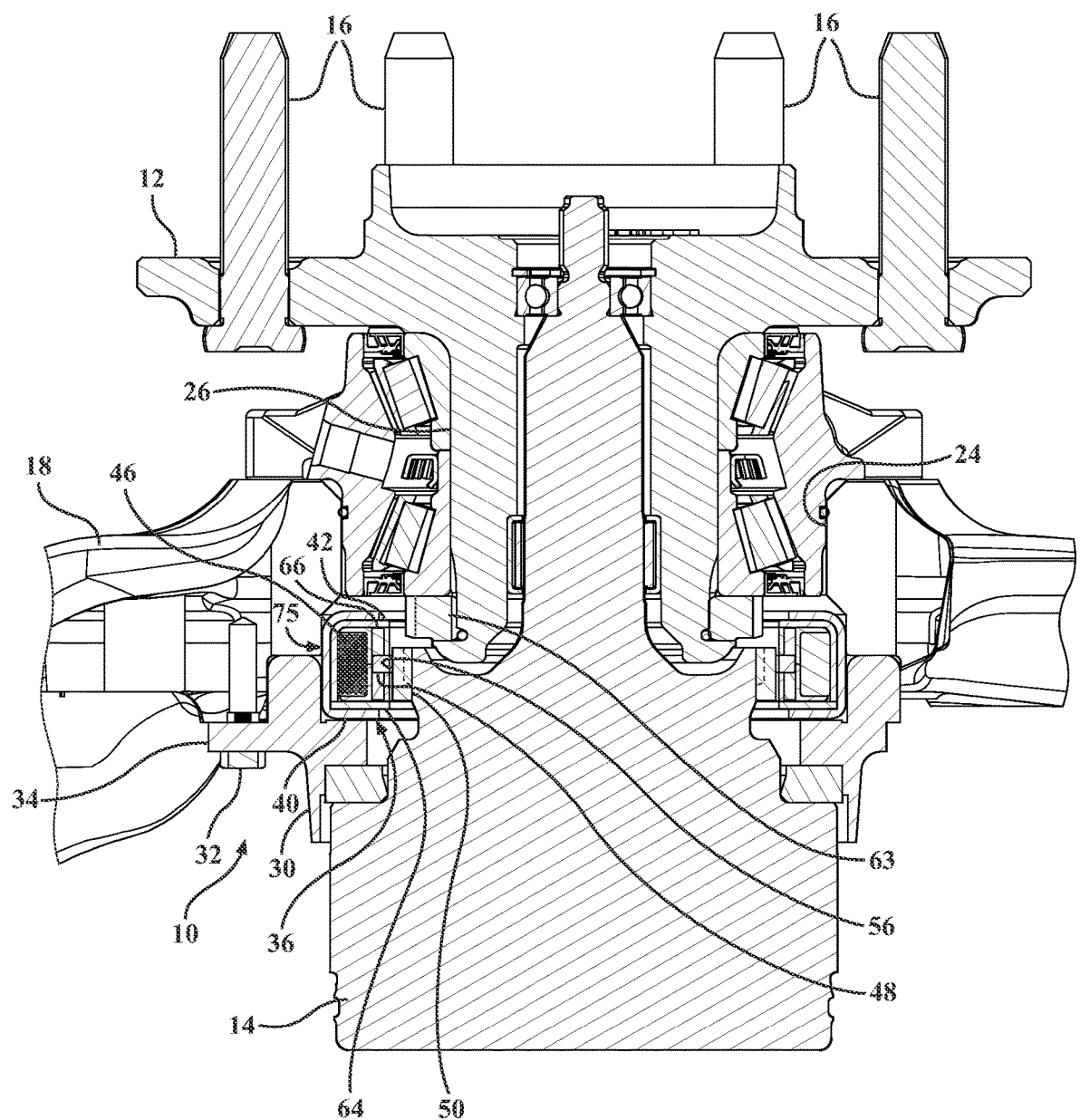
FIG. 5 is a cross-sectional top view of box 5 of FIG. 2.

Referring specifically to FIG. 3, the shift sleeve 50 is in its disconnected position (as far left as it can go given its orientation as shown in FIG. 3). While the shift sleeve 50 is always connected with the drive shaft 14 (as discussed above), it is in a position referred to as it is disconnect position because the shift sleeve 50 is disconnected from the hub shaft 26. Now, referring specifically to FIG. 4, the shift sleeve 50 is in its connected position (as far right as it can go given its orientation as shown in FIG. 4). In this position, the plurality of teeth 54 of the shift sleeve 50 spline with a plurality of teeth 62 cut into an outer surface of a hub shaft spacer 63, which is fixedly secured to the hub shaft 26. Thus, the shift sleeve 50 operatively splines the drive shaft 14 to the hub shaft 26 such that the torque acting on the drive shaft 14 is transferred directly to the wheel hub 12.

The shift sleeve 50 is fabricated from a ferromagnetic material, which allows it to be permeated by the electromagnetic field created by the linear actuator 36. When the current passing through the electromagnetic coil 46 is in one direction, the shift sleeve 50 moves to its disconnect position. When the current passing through the electromagnetic coil 46 is in a second direction, the shift sleeve 50 moves to its connect position. Therefore, the disconnecting of the wheel hub 12 from the drive shaft 14 is affected by the movement of the shift sleeve 50 due to the direction of current passing through the electromagnetic coil 46 of the linear actuator 36.

The driveline disconnect assembly 10 includes a disconnect set of magnets 64. The disconnect set of magnets 64 are disposed in end-to-end alignment adjacent the disconnect side 40 of the linear actuator 36. In addition, the disconnect set of magnets 64 extend between the electromagnetic coil 46 and the shift sleeve 50. The disconnect set of magnets 64 latch the shift sleeve 50 into its disconnect position allowing the wheel hub 12 to move freely and independently from the drive shaft 14. In other words, the disconnect set of magnets 64 latch the shift sleeve 50 when the shift sleeve 50 is moved to its disconnect position by the magnetic field created by the electromagnetic coil 46. The latching of the shift sleeve 50 maintains the shift sleeve 50 in its disconnect position after the magnetic field generated by the electromagnetic coil 46 ceases to exist because the electrical current stops passing through the electromagnetic coil 46. This eliminates the requirement of having an electric current continually passing through the electromagnetic coil 46.

Likewise, the driveline disconnect assembly 10 also includes a connect set of magnets 66 disposed in end-to-end alignment adjacent connect side 42 of the linear actuator 36. In addition, the connect set of magnets 66 extend between the electromagnetic coil 46 and the shift sleeve 50. Like the disconnect set of magnets 64, the connect set of magnets 66 latch the shift sleeve 50 in its connect position such that the wheel hub 12 is connected to the drive shaft 14 with no lost motion therebetween. In this position, the shift sleeve 50 acts to spline the drive shaft to the hub shaft 26. The disconnect set of magnets 64 and the connect set of magnets 66 are separated by the ring 48.

The linear actuator 36 includes a bobbin, generally shown at 68. The electromagnetic coil 46 is wrapped around a bobbin base 70 and between two bobbin side walls 72, 74. In this embodiment, the bobbin 68 is fabricated of a non-ferrous material, such as a thermoplastic. It should be appreciated by those skilled in the art that the bobbin 70 extends along the linear actuator 36. In the embodiments shown, the bobbin 70 defines a continuous loop. In the embodiment shown, the continuous loop is circular, and is coaxial about axis A. Together, the bobbin 68, the sets of magnets 64, 66, the ring 48 and the electromagnetic coil 46 form what is commonly referred to as a stator, generally shown at 75.

Figure 9:
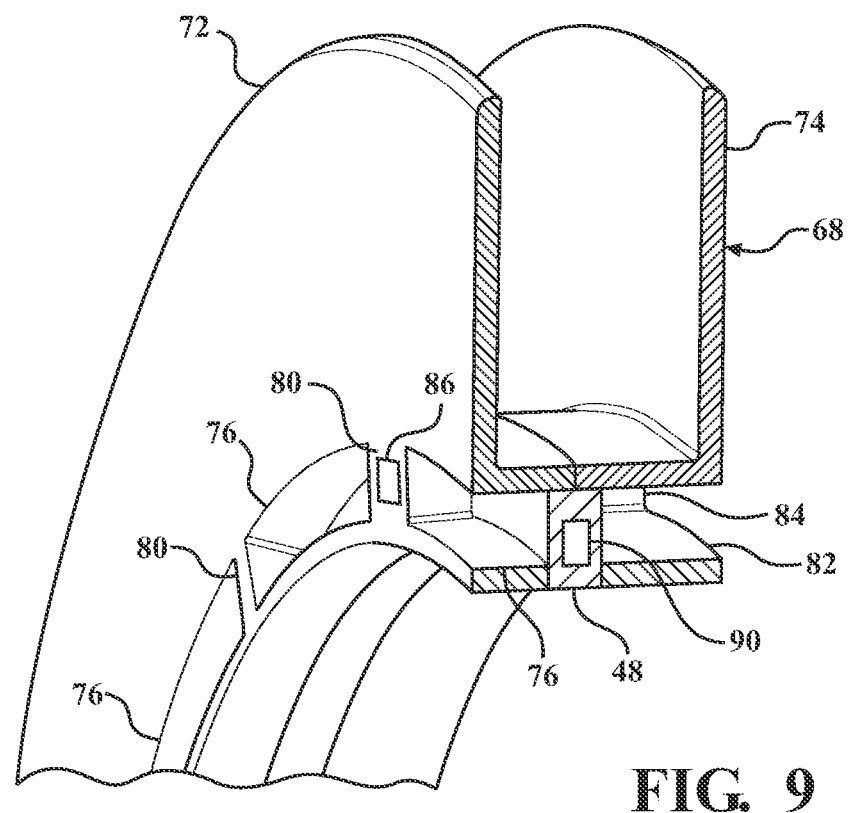
FIG. 9 is a cross-sectional perspective view of a bobbin used in the first three embodiments of a driveline disconnect assembly.
Figure 10:
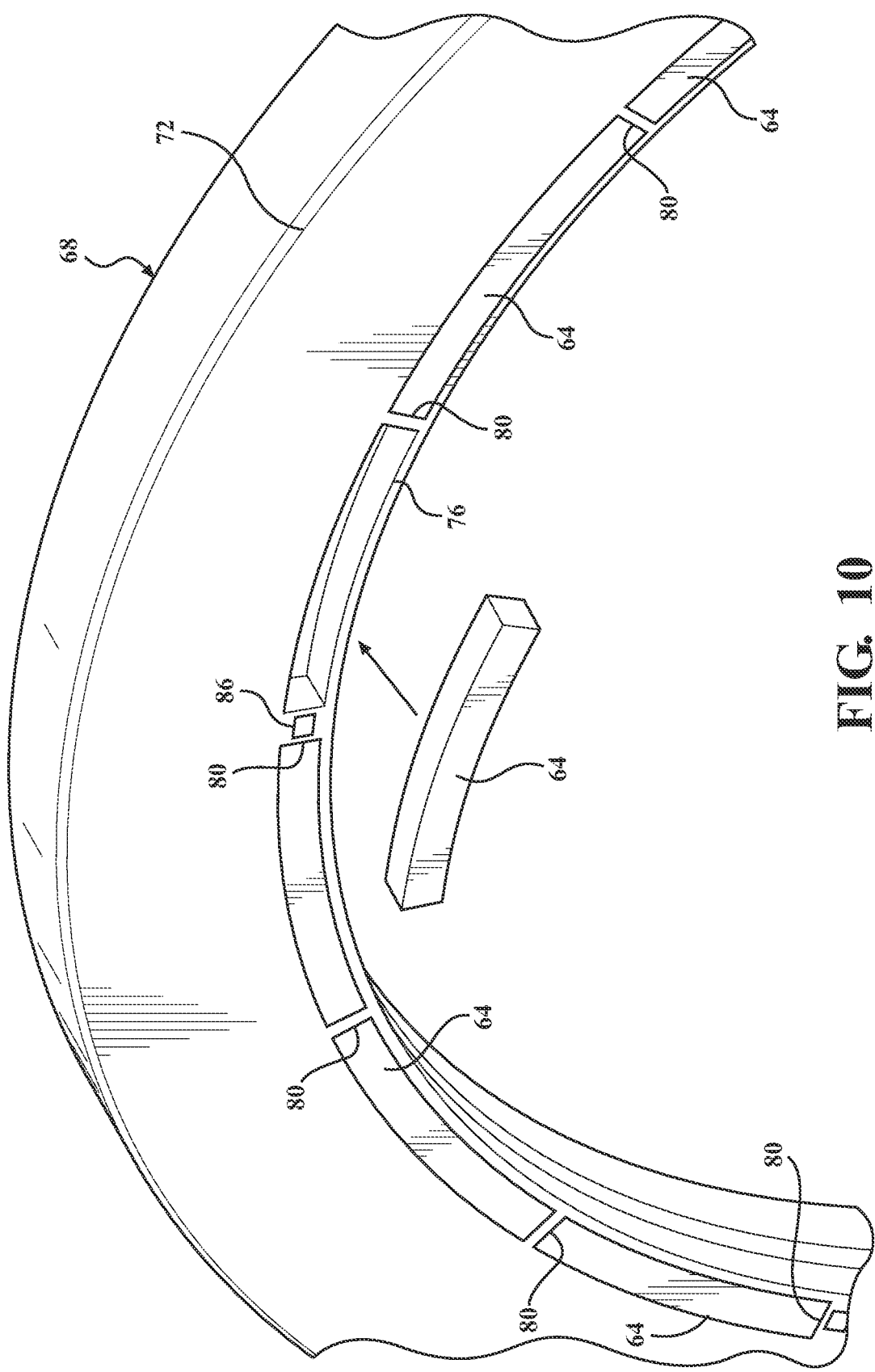
FIG. 10 is an exploded perspective view of the bobbin, shown in FIG. 9, and magnets used in the first three embodiments of the driveline disconnect assembly.

Referring to FIGS. 9 and 10, and an enlarged view of the bobbin 68 is shown to include a disconnect channel 76. The disconnect channel 76 receives the disconnect set of magnets 64 therein. Each of the disconnect set of magnets 64 extends through an arc such that the disconnect set of magnets 76 will form a circle within the disconnect channel 76. In the embodiment shown, the disconnect channel 76 includes a plurality of partitions 80 that separate each of the disconnect set of magnets 64. The bobbin 68 includes a connect channels 82 having partitions 84 (one shown in FIG. 9). The channel partitions 80, 84 help properly space the disconnect 64 and connect 66 sets of magnets, respectively.

At least one position sensor 86 is secured within at least one of the each of the partitions 80, 84 so that both the axial and angular positions of the shift sleeve 50 can be determined. The axial position of the shift sleeve 50 is important because it will help identify whether the wheel hub 12 and the drive shaft 14 are connected. Second, by identifying the angular position/orientation of the shift sleeve 50, it will be able to know when to move the shift sleeve 50 axially to engage the plurality of teeth 62 on the hub shaft spacer 63. If the plurality of teeth 54 are not aligned to be received by the plurality of teeth 62 on the hub shaft spacer 63, the connection between the wheel hub 12 and drive shaft 14 will not occur.

Figure 6:
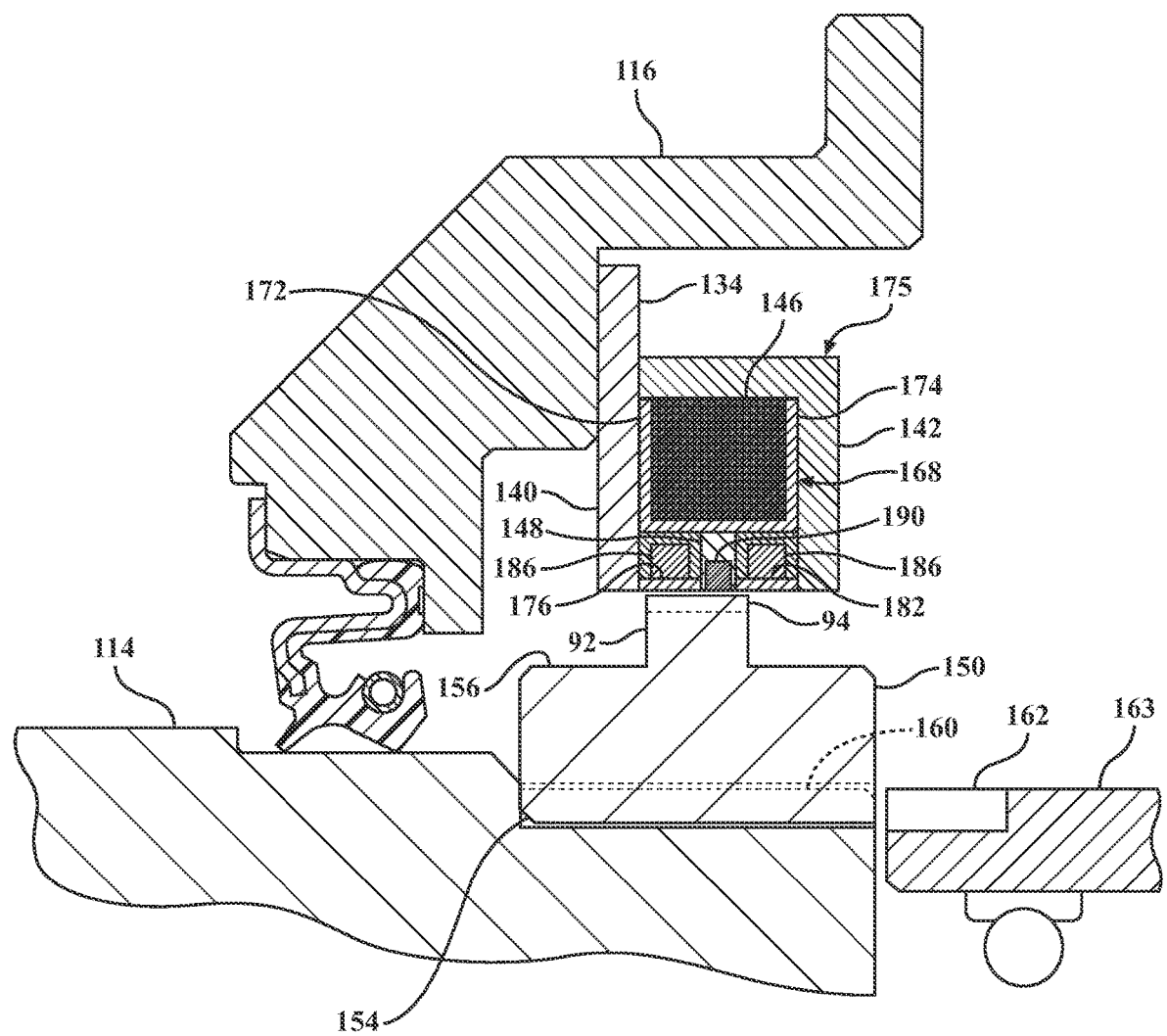
FIG. 6 is a cross-sectional side view of a second embodiment of a driveline disconnect assembly.
Figure 7:
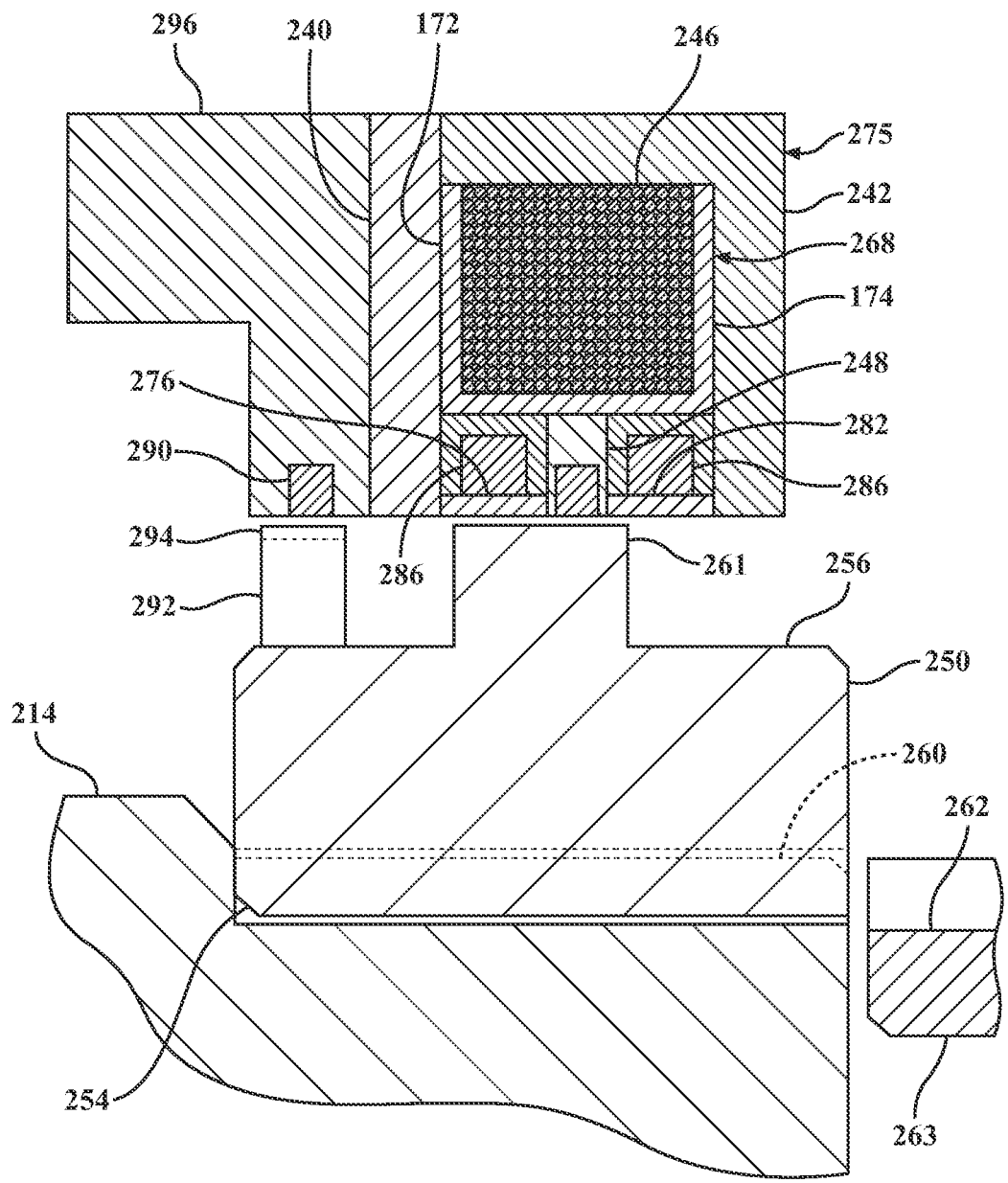
FIG. 7 is a cross-sectional side view of a third embodiment of a driveline disconnect assembly.

Referring to FIG. 6, a second embodiment of the driveline disconnect assembly 110 includes at least one speed sensor 90 mounted within the ring 148 of the bobbin 168 to measure rotational speed of the shift sleeve 150 relative to the bobbin 168. The speed sensor 90 would be between the disconnect 64 and connect 66 set of magnets and in line with the channel partitions 80, 84 in order to minimize the electromagnetic field generated by the electromagnetic coil 46 and the sets of magnets 64, 66 will have on the at least one speed sensor 90. In this embodiment, the shift sleeve 150 includes a tone ring 92 extending therearound. The tone ring 92 may include a set of teeth 94 so the at least one speed sensor 90 can measure the speed as the teeth 94 pass thereby when rotating. FIG. 7 shows a similar embodiment, but with the at least one speed sensor 190 at an end of the shift sleeve 250 associated with the disconnect side 240 of the linear actuator 236. In this instance, the at least one speed sensor 290 is housed within an electrical connector 296 molded into the linear actuator 236 (where electrical current for the electromagnetic coil 246 and data from the sensors 286, 290 may pass therethrough). The tone ring 292 is mounted to the one end of the shift sleeve 250 and a flux extension 261 extends up from the outer surface 256 of the shift sleeve 250 to collect the magnetic flux created by the electromagnetic coil 246.

Figure 8:
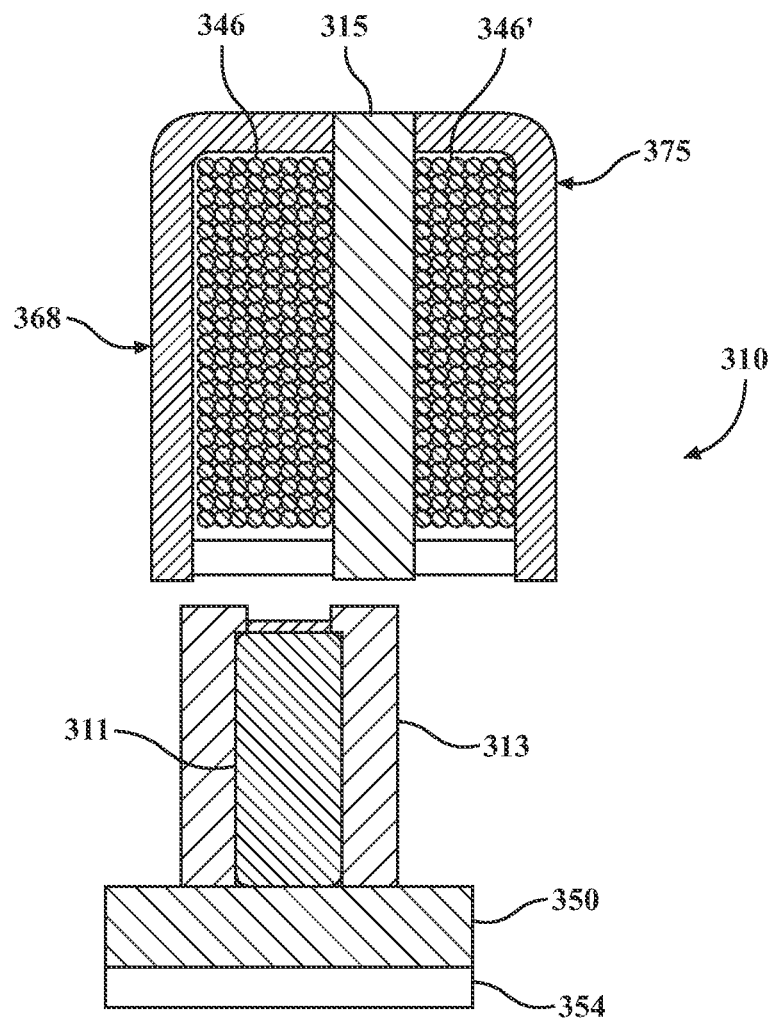
FIG. 8 is a cross-sectional side view of a fourth embodiment of a driveline disconnect assembly.

Referring to FIG. 8, the linear actuator 310 shown does not include either set of magnets on the stator 375. As an alternative, a set of sleeve magnets 311 are secured to the shift sleeve 350. The set of sleeve magnets 311 are secured to the shift sleeve 350 in a low carbon steel case 313, such as SAE 1010 or 1018 steel. The set of sleeve magnets 311 and the steel case 313 are secured to the shift sleeve 350 with rivets and glue. It should be appreciated by those skilled in the art that any suitable device, either mechanical or chemical, or a combination of both, may be used to secure these elements together. The stator 375 of the linear actuator 310 includes a center steel 315. The center steel 315 separates two electromagnetic coils 346, 346' and provides a flux path for each of the electromagnetic coils 346, 346'. The two electromagnetic coils 346, 346' have an electrical current passing therethrough at separate times to move the shift sleeve 350 one way or the other. This linear actuator 310 also latches due to the fact that the set of sleeve magnets 311 move with the shift sleeve 350 and the magnetic field generated by the set of sleeve magnets 311 is strong enough to prevent the shift sleeve 350 from moving across the center steel 315.

Figure 11:
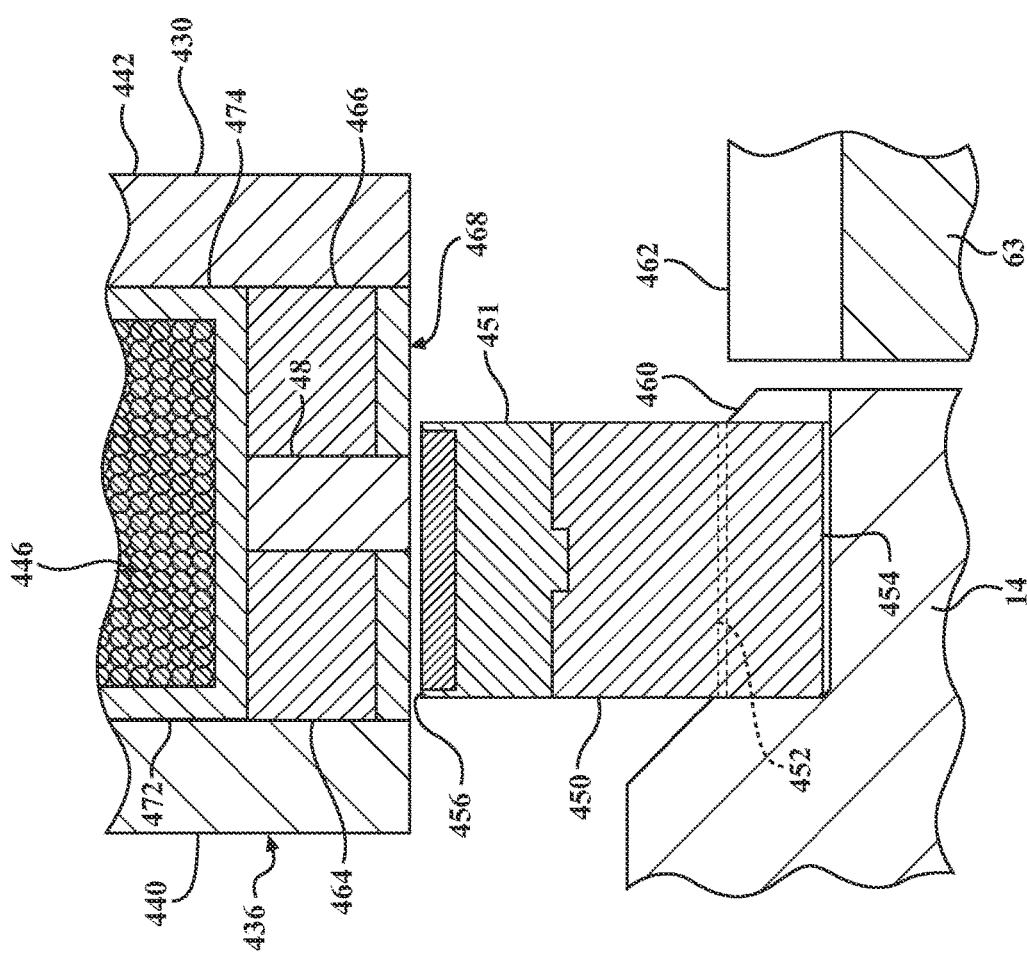
FIG. 11 is a cross-sectional side view, partially cut away, of a fifth embodiment of a driveline disconnect assembly.

Referring to FIG. 11, a fifth embodiment of the driveline disconnect assembly 410 is shown. It is similar to the embodiment shown in FIG. 6. The shift sleeve 450 includes an intermediate layer 451. In the embodiment shown, the intermediate layer 451 is an overmolded thermoplastic layer and extends up to the outer surface 456 of the shift sleeve 450. It should be appreciated by those skilled in the art that the intermediate layer 451 may be fabricated from any material that has a high dielectric constant and can be secured to the shift sleeve 450. The intermediate layer 451 provides a dielectric to create a barrier between the disconnect 464 and connect 466 sets of magnets on the one hand, and the drive shaft 416 and hub shaft space 463 on the other hand. The intermediate layer 451 prevents dilution of the magnetic flux flowing through the shift sleeve 450.

In order to capture as much of the magnetic flux created by the disconnect 464 and connect 466 sets of magnets as possible, a flux receiving ring 453 is embedded into the intermediate layer 451 at the outer surface 456 of the shift sleeve 450. In the embodiment shown, the flux receiving ring 453 is fabricated of a low carbon steel, such as ASE 1010 or 1018 steel.

Figure 12:
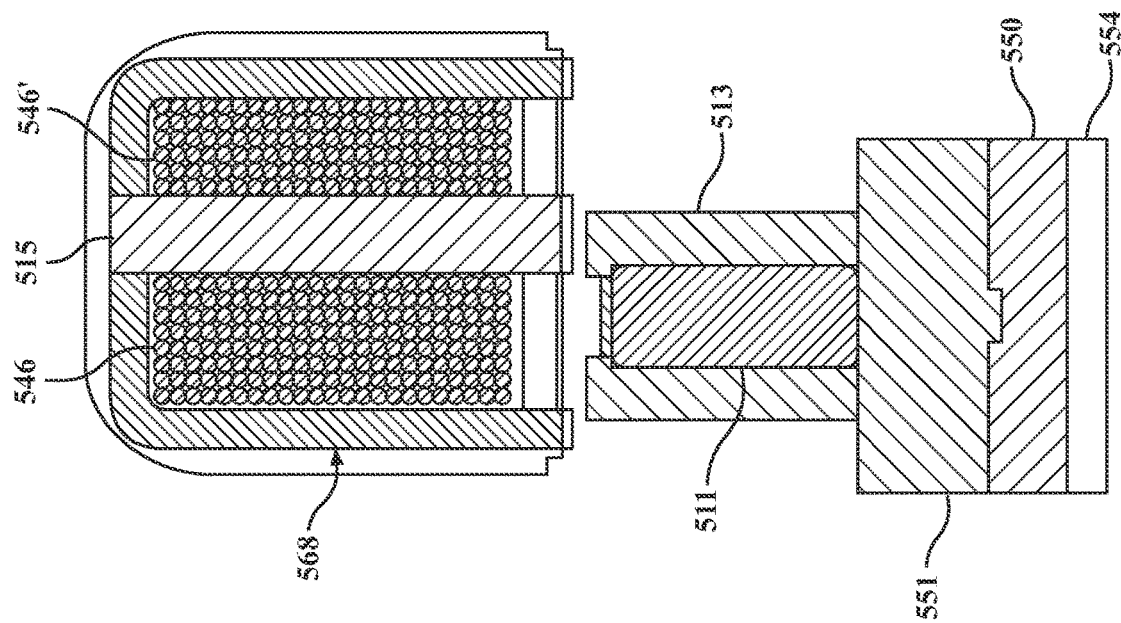
FIG. 12 is a cross-sectional side view of a sixth embodiment of a driveline disconnect assembly.

Referring to FIG. 12, a sixth embodiment of the driveline disconnect assembly 510 is shown. It is similar to the embodiment shown in FIG. 8. It differs from the embodiment shown in FIG. 8 in that the shift sleeve 550 includes the intermediate layer 551. Again, the intermediate layer 551 is an overmolded thermoplastic layer with a high dielectric constant, and it extends between the shift sleeve 550 and the set of sleeve magnets 511.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A driveline disconnect assembly for disconnecting a wheel hub from a drive shaft supported by a suspension knuckle, said driveline disconnect assembly comprising:
   a support frame fixedly secured to the suspension knuckle, said support frame extending around at least a portion of the drive shaft, said support frame extending between first and second support frame sides and defining a central axis;
   a linear actuator fixedly secured to said support frame and extending around at least a portion of the drive shaft, said linear actuator including a bobbin;
   a shift sleeve moving axially relative to said support frame, said shift sleeve extending around at least a portion of the drive shaft to selectively engage and disengage the wheel hub to connect and disconnect the wheel hub from the drive shaft, respectively;
   at least one speed sensor mounted within said bobbin to measure rotational speed of said shift sleeve relative to said bobbin; and
   a tone wheel fixedly secured to said shift sleeve opposite said at least one speed sensor on said bobbin.

2. A driveline disconnect assembly for disconnecting a wheel hub from a drive shaft supported by a grounding component, said driveline disconnect assembly comprising:

a support frame fixedly secured to the grounding component, said support frame extending around at least a portion of the drive shaft, said support frame defining a central axis;

a linear actuator fixedly secured to said support frame and extending around at least a portion of the drive shaft, said linear actuator defining a disconnect side and a connect side, said linear actuator including an electromagnetic coil extending between said disconnect and connect sides, and along at least a portion of said support frame and configured to allow electric current to pass therethrough in either direction creating magnetic flux based on the electric current and its direction; and a shift sleeve moving axially relative to said linear actuator, said shift sleeve extending around at least a portion of the drive shaft to selectively engage and disengage the wheel hub to connect and disconnect the wheel hub from the drive shaft, respectively, said shift sleeve including an intermediate layer extending between said shift sleeve and said linear actuator to insulate the drive shaft from the magnetic field created by said electromagnetic coil of said linear actuator.

3. The driveline disconnect assembly as set forth in claim 2 wherein said shift sleeve further includes a flux receiving ring extending about said intermediate layer of said shift sleeve to concentrate the magnetic field created by said electromagnetic coil of said linear actuator through said flux receiving ring.

* * * * *